Figure 1:
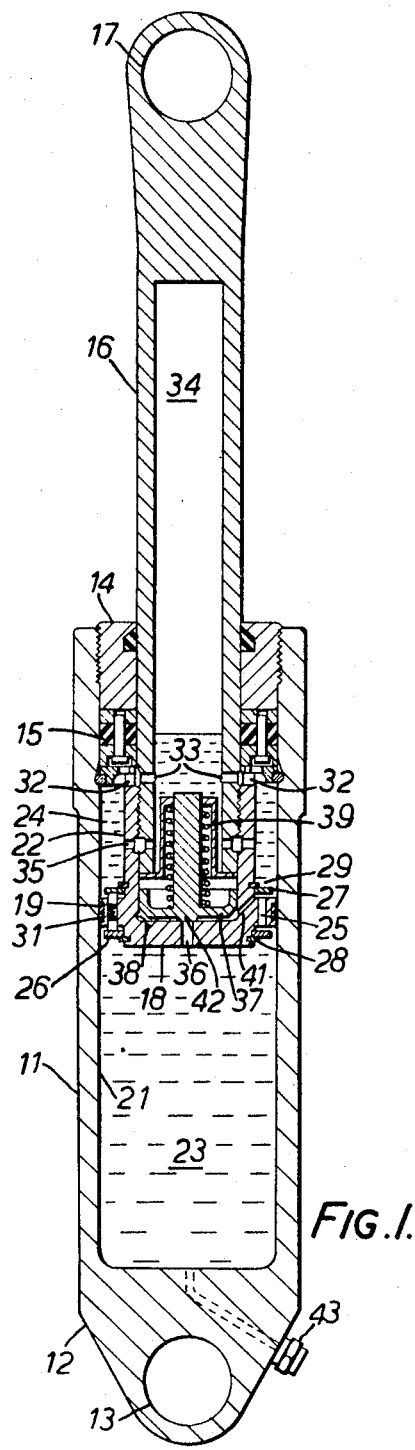

United States Patent [19]
Savery

[11] 3,747,913
[45] July 24, 1973

[54] FLUID SPRING SHOCK ABSORBERS
[75] Inventor: Ralph Savery, Gloucester, England
[73] Assignee: Dowty Rotol Limited, Gloucester, England
[22] Filed: Aug. 2, 1971
[21] Appl. No.: 168,211

[30] Foreign Application Priority Data
Aug. 15, 1970 Great Britain................39440/70

[52] U.S. Cl............................................... 267/64 R
[51] Int. Cl.............................................. F16f 5/00
[58] Field of Search............. 267/65 R, 65 A, 65 B, 267/64 R

[56] References Cited
UNITED STATES PATENTS

| | | | |
|---|---|---|---|
| 2,107,494 | 2/1938 | Onions et al. | 267/64 R |
| 3,626,864 | 12/1971 | Wiebe | 267/64 A |
| 2,909,368 | 10/1959 | Taylor | 267/64 A |
| 3,348,835 | 10/1967 | Casey | 267/65 R |

*Primary Examiner*—James B. Marbert
*Attorney*—Irvin S. Thompson and Robert J. Patch

[57] ABSTRACT

A shock absorbing and energy dissipating device suitable for an aircraft landing gear comprising:
i. a cylinder;
ii. a piston rod, of smaller diameter than the internal diameter of the cylinder, movable into and out from the cylinder through a seal at one end of the cylinder, the other end of the cylinder, which is the end intended to be lowermost in use, being closed;
iii. a piston carried by the piston rod and sealingly engaging the cylinder;
iv. a volume of liquid in the cylinder;
v. means for restricting flow of liquid from one side of the piston to the other as the piston moves in the cylinder towards said other end of the cylinder;
vi. a container, containing a volume of gas in direct unrestricted communication with liquid at the said one end of the cylinder; and
vii. flow-passage means adapted to permit unrestricted flow of fluid from one side of the piston to the other when the device is in its fully-extended position;
viii. the liquid and the gas being pressurized in the fully extended position of the device to a value adapted to overcome frictional force associated with the device when an external load thereon is removed thereby to extend the device to its fully-extended position; and
ix. the volume occupied by gas in such position being less than the volume of the piston rod introduced into the cylinder by movement of the rod from the fully-extended position to the fully-contracted position.

12 Claims, 3 Drawing Figures

United States Patent [19]
Savery
[11] 3,747,913
[45] July 24, 1973
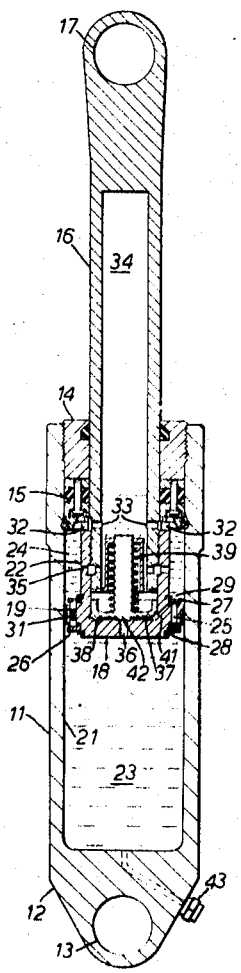

PATENTED JUL 24 1973

3,747,913

SHEET 1 OF 3

FLUID SPRING SHOCK ABSORBERS

This invention relates to a combined shock absorbing and energy dissipating device suitable for aircraft landing gear. It is a general requirement for all aircraft components to be as light and as small as possible to carry out their intended functions. The basic functions of a combined shock absorbing and energy dissipating device are firstly to support the weight of the aircraft when on the ground with a damped resilience to facilitate taxying over the ground and, secondly, to absorb and dissipate the kinetic energy of the vertical component of aircraft velocity when landing.

In the recent past, combined shock absorbing and energy dissipating devices for aircraft have fallen into two classes:

1. The oleo-pneumatic piston-and-cylinder type in which shock absorbing is effected by compression of preloaded gas and energy dissipation is effected by a hydraulic dash-pot device.
2. The liquid spring piston-and-cylinder type in which the liquid of a hydraulic dash-pot is subjected to elastic compression so that the same volume of liquid provides both shock absorption and energy dissipation.

Class 1 devices suffer from the disadvantage of larger size and substantial weight since they invariably include separate piston-and-cylinder devices for the gas and the liquid, and also operate at comparatively low pressures.

Class 2 devices improve on the Class 1 devices by not requiring space for shock absorbing gas, but on the other hand the liquid is subjected to substantially higher pressures than in Class 1 devices and the single cylinder is therefore somewhat heavier to withstand the higher pressures. Thus there is little weight difference between Class 1 and Class 2 devices, but a Class 2 device shows substantial space saving.

The principal object of the present invention is to provide a combined shock absorbing and energy dissipating piston-and-cylinder device in which one volume of liquid performs shock absorbing and energy dissipating functions and in which there is substantial space and weight reduction as compared with either of the two known classes of device set out above.

A practical disadvantage of a Class 2 device is that it cannot function equally well over a range of atmospheric temperatures such as are normally encountered by an aircraft since with increasing temperature the volume of liquid within the device will expand or tend to expand and thereby increase the liquid pressure to the extent to impair the shock absorbing function, and with reduced temperature the volume of liquid will contract and prevent full extension of the device.

A further object of the present invention is to provide a combined shock absorbing and energy dissipating device which uses one volume of liquid for shock absorbing and energy dissipating functions and in which temperature variations as normally encountered in the atmosphere will not adversely effect these functions in a substantial way.

In accordance with the present invention a shock absorbing and energy dissipating device suitable in an aircraft landing gear comprises:

i. a main container having a single aperture intended to be uppermost in use
ii. a plunger movable into and out of the aperture in the main container
iii. a seal at the said aperture to sealingly engage against the relatively movable surface of the plunger
iv. a volume of liquid within the main container
v. a second container containing gas at pressure
vi. a restricted flow passage between the main container and the second container for restricting liquid flow between them
vii. an unrestricted flow passage for unrestricted gas flow in a generally upward direction from substantially the whole volume of the main container to the second container open when the plunger is in its fully extended position.

The invention achieves its main object by the increased compressibility of the total fluid in the shock absorber and by the fact that the shock loading pressures are confined to the liquid. Preferably, the liquid pressures generated in the shock absorber are arranged not to exceed about 40,000 p.s.i., this pressure representing the maximum pressure at which the main container in the form of a cylinder may be constructed without pre-stressing and also the maximum pressure at which the dynamic seal is capable of efficient long-wearing operation. The main container may be a cylinder and the plunger may be a piston rod carrying at its inner end a piston sliding in the cylinder.

As compared with a conventional Class 2 device limited to a maximum of 40,000 p.s.i. the invention enables the piston-and-cylinder to be suitably reduced in diameter whilst the piston rod diameter is either unaltered or slightly larger. This reduction in piston diameter is compensated by altering the restrictor or valve means controlling flow between the sides of the piston so as to increase the shock loading pressure towards the static loading pressure. It will be appreciated that static loading pressure acts effectively only over the cross-section of the piston rod whereas as the shock loading pressure acts jointly on the piston and the piston rod. Therefore a lower shock loading pressure can represent a higher thrust in the piston rod than would be obtained for the higher static pressure. Thus as compared with a Class 2 device the energy dissipation characteristics may be identical.

The presence of the gas increases the compressibility of the total fluid content of the cylinder so that the total extended fluid volume needs to be only about five times the reduction of fluid volume during piston rod movement into the cylinder over a full working stroke. A Class 2 device requires a liquid capacity of at least ten times the reduction of liquid volume for maximum piston rod stroke if moderately high pressures only are used. Where the maximum static pressure is 40,000 p.s.i., the piston rod may be made of tubular form, the volume available within it being sufficient to accommodate the volume of gas.

There needs to be no means to separate the gas from the liquid, provided that at the pressurised pressure the gas will not dissolve to any substantial extent in the liquid thus ensuring that pressure is available to extend the piston rod when the device is unloaded. At the higher pressures within the cylinder generated by movement of the piston rod into the cylinder the gas may dissolve in the liquid, but this produces no real difficulty since the volume of liquid present is quite adequate on its own to give the shock absorption and energy dissipation that may then be necessary.

Figure 2:
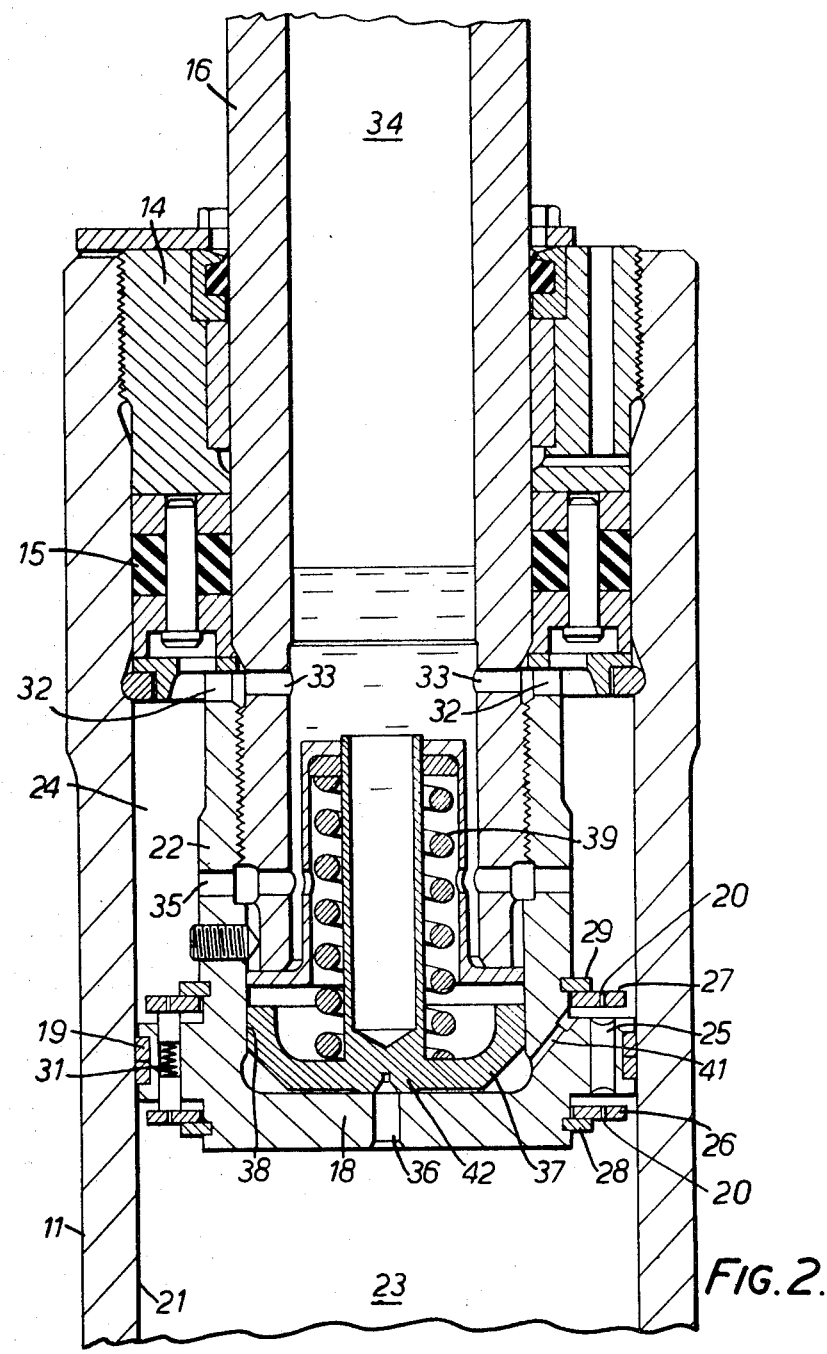
Figure 3:
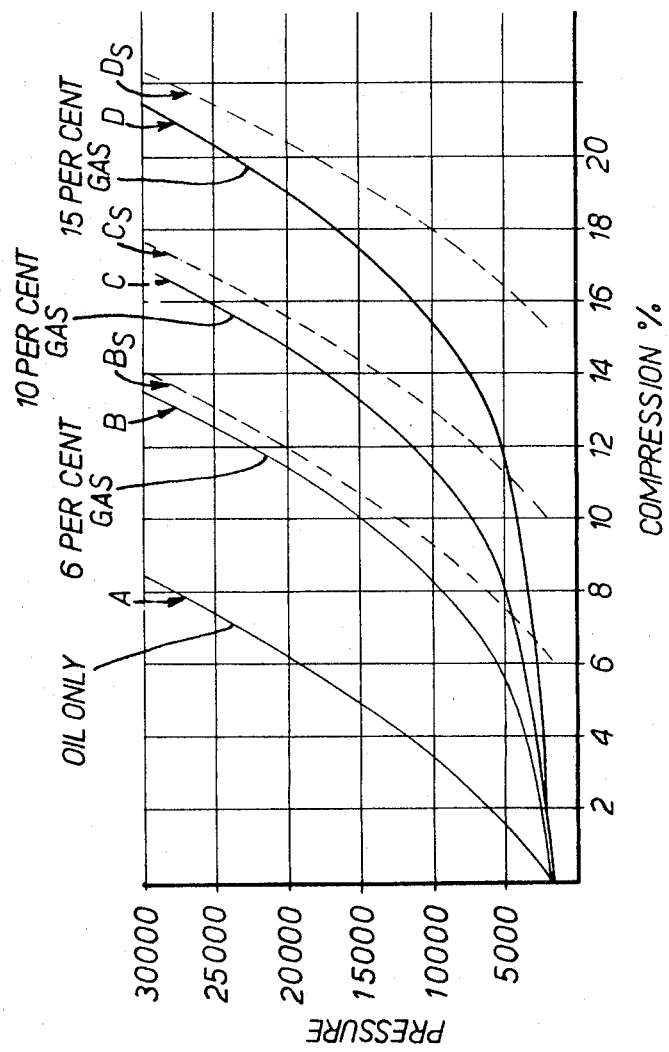

A combined shock-absorbing and energy dissipating device suitable for an aircraft undercarriage is illustrated in the drawings, in which FIG. 1, accompanying the Specification, is a longitudinal section, FIG. 2 accompanying the Specification, is a detail of FIG. 1 on an enlarged scale, and FIG. 3 accompanying the Specification, is a diagram showing the effect of different proportions of liquid and gas under compression.

In FIG. 1, a cylinder member 11 has one closed end 12 formed with a pivotal attachment eye 13, while the other end is closed by a screw-threaded ring 14 which supports a packing gland assembly 15 of the well known kind having an unsupported area. A piston rod 16 extending slidably through the ring 14 and the packing gland assembly 15, has its outer end portion formed with an attachment eye 17. A piston 18 carries a piston ring 19 which slidably engages the bore 21 of the cylinder 11, and it is formed with a skirt portion 22 which is screw-threadedly engaged with the inner end portion of the piston rod 16.

The cylinder 11 and the piston 18 and rod 16 define a lower chamber 23 below the piston, an upper chamber 24 above the piston and a cavity 34 within the piston rod 16. A circular row of holes 25 are formed in the piston. A lower orifice plate 26 and an upper orifice plate 27 are urged towards retaining rings 28 and 29 by light springs 31. These springs are located in some of the holes 25, while leaving the other holes unobstructed particularly for passage of gas. The lower and upper orifice plates 26, 27 are alternatively movable by fluid flow, when the piston 18 moves in the bore 21, in one direction or the other to seat on the holes 25 so that restrictor holes 20 in the plate act to restrict flow of liquid from one side of the piston to the other to provide energy dissipation. Very low piston speeds will not cause movement of the orifice plates.

The skirt portion 22 is engageable with the gland assembly 15 to limit telescopic extension of the cylinder and piston members. Slots 32 in the skirt portion 22 and holes 33 in the piston rod 16 connect the upper part of the upper chamber 24 to the cylindrical cavity 34 which is formed within the piston rod 16. A second connection is provided by holes 35 in the skirt portion 22 and in the piston rod 16 at a position nearer to the piston 18.

A relief valve is provided having a valve orifice 36 in the piston 18, and a piston-like valve member 37 which is slidable in a bore 38 within the piston, the valve member 37 having a central projection 42 which closes the orifice 36 under the load of a spring 39. A discharge orifice 41 leads from the bore 38 on the discharge side of the orifice 36 to the chamber 24. The discharge orifice 41 may provide a restriction across which the valve discharge develops a pressure difference acting on the valve member 37, whereby the relief valve, once open, tends to remain open during shock absorber compression.

A charging nozzle 43 fitted to the closed end 12 of the cylinder 11, communicates with the chamber 23.

To put the shock absorber in readiness for use, it is filled with hydraulic liquid in the fully extended condition so that the entire chamber, i.e. the lower chamber 23, the upper chamber 24 and the cavity 34 are full of liquid. With a drain plug, not shown, adjacent the charging nozzle 43 open, the shock absorber is telescopically contracted so that the chamber is reduced in volume by a predetermined percentage of the maximum volume. The drain plug is then closed and nitrogen, or other inert gas, is introduced so that the shock absorber extends and becomes charged to a predetermined pressure. This pressure is initially higher than the required pre-load pressure but it will fall as gas passes into solution in the hydraulic liquid until there is equilibrium between the dissolved gas and the remaining free gas. At this stage of equilibrium, the pressure in the chamber will be substantially equal to the required pre-load pressure. This condition is more rapidly achieved by operating the shock absorber so that the liquid and gas become mixed.

FIG. 3 shows the relationship between static pressure and percentage compression of a fluid contained in a shock absorber for different proportions of liquid and gas. The pressure is measured in pounds per square inch (p.s.i.) while the compression is the reduction of fluid volume expressed as a percentage of maximum fluid volume, that is, the volume at full extension of the shock absorber.

Curve A shows the relationship for a fluid filling consisting wholly of a suitable mineral oil, as in a liquid spring. The compression at 30,000 p.s.i. is 8.3 per cent.

Curve B shows the relationship for a fluid filling having 94 per cent of liquid and 6 per cent of free gas at 1500 p.s.i. in equilibrium with the gas in solution. In an aircraft at rest on the ground, the static loading on an undercarriage incorporating the shock absorber will produce a pressure in the shock absorber considerably in excess of the pre-load pressure, whereby over a period of time all the free gas enters into solution. The relationship between pressure and compression then follows the broken line curve B$s$.

Curves C and D illustrate the relationships for fluid fillings having 10 per cent and 15 per cent respectively of free gas, while the broken line curves C$s$ and D$s$ illustrate the respectively related curves when all the gas has entered into solution due to the undercarriage standing on the ground under load.

Considering, for example, a shock absorber containing 15 per cent gas at 1500 p.s.i., the gas will pass into solution when the aircraft is standing on the ground. During taxying and prior to takeoff of the aircraft, the relationship between the pressure and the compression will substantially follow the broken line curve D$s$ if the effect of the damping by the orifice plates 26 and 27 is ignored.

When the landing gear is retracted, the load on it is removed and the gas pressure will now act to extend the shock absorber fully against any frictional resistance due for example to the seal 15 even though during retraction the shock absorber may be located with chamber 23 uppermost. Some of the gas will come out of solution to maintain the pre-load pressure. When the landing gear is lowered prior to landing, into a poistion where the chamber 23 is lowermost, any free gas in the lower chamber 23 will flow through the open holes 25 in the piston 18, since the orifice plates 26 and 27 will be held clear of the holes 25 by the springs 31.

Any gas in the upper chamber 24 will flow through the slots 32 and the holes 33 into the cavity 34, while liquid thus displaced from the cavity will flow through the lower holes 35 into the upper chamber 24. Slots 32 and holes 33 must therefore be sufficiently large for unrestricted gas flow. On touch down, the lower chamber 23 is substantially filled with hydraulic liquid with a minimum of gas in solution.

The relationship between pressure and compression will, assuming the original gas proportion is 15 per cent, during the initial landing shock at least, follow the curve C if the effect of the damping by the orifice plates 26 and 27 is ignored, whereby there is continuously increasing fluid pressure resistance to compression of the shock absorber from the fully extended condition.

Damping or energy dissipation on initial landing results from the rapid movement of the piston 18 into the chamber 23 which will immediately seat the plate 26 on to the passages 25 so that the only excape passage is through restrictors 20 into chamber 24. Since the piston has a smaller diameter than the equivalent Class 2 device the pressure generated in chamber 23 is higher to provide the same shock load and the restrictors 20 are of suitable size to provide such pressures. The relief valve 37 is of substnatially identical structure with a relief valve for use on an equivalent Class 2 device with the exception that the orifices 36 and 41 are smaller. The size of orifice 36 in conjunction with the preloading of spring 39 is such that a pressure difference of about 20,000 p.s.i. between chambers 23 and 24 is necessary to lift valve member 37. Liquid flow from chamber 23 then flows in succession through orifices 36 and 41, the pressure drop through orifice 41 acting on the full area of valve 37 to maintain it open. This pressure drop, which is the pressure difference between chambers 23 and 24, is considerably lower than the pressure originally needed to lift valve 37 and can only occur after the piston rod has entered substantially into the cylinder and the static pressure has itself become quite high to resist further shock absorber compression. Thus during landing the pressure in chamber 23 could be quite high over the majority of the shock absorber stroke due to the combined shock absorbing and energy dissipating action and for preference this pressure is designed not to exceed about 30,000 p.s.i. The structure of cylinder 11 may then have a reasonably thin wall and avoid the need for pre-stressing.

In the described embodiment the percentage of gas is arranged to be about 15 per cent of the total extended fluid volume whilst the volume of piston rod entering the cylinder over its full stroke is about 20 per cent of the total extended fluid volume. In the equivalent Class 2 device if pressure is to be kept down to 30,000 p.s.i. the volume of piston rod entering the cylinder for full stroke can only be about 8 per cent of the extended liquid volume. Thus it will be seen that the present invention enables a very substantial reduction in cylinder size, as compared with a Class 2 device, to be obtained.

The described embodiment also incorporates recoil damping. During recoil of the shock absorber the liquid pressure in chamber 23 acting over the full area of piston 18 will act to urge the piston rod outwardly against the liquid pressure in chamber 24 so that liquid will flow from chamber 23 to chamber 24 to seat plate 27 on the passages 25. Restrictors 20 in plate 27 will then restrict such flow and damp the recoil.

Yet another advantage over a Class 2 device is that the shock absorber can extend the landing gear fully at low temperatures when relieved of ground load, where a filling of hydraulic liquid alone would otherwise be unable to effect full extension of the effect of different thermal expansion coefficients of the shock absorber body and the liquid.

When the temperature of the present shock absorber falls, the compressed gas expands to compensate for reduction of liquid volume and ensure full extension of the landing gear, such full extension being essential for effective energy dissipation over the whole stroke during landing.

In the described embodiment the holes 25 in the piston are provided of such size that when the piston is static within the cylinder gas may easily pass through towards the chamber 34. In an alternative embodiment the holes 25 may be replaced by a groove or grooves in the wall of the cylinder 21 at the position occupied by the piston in the fully extended position of the piston rod. The piston includes one or more permanently restricted holes to dampen movement of the piston in the cylinder and the relief valve 37. The groove or grooves will permit unrestricted flow of gas bubbles around the piston when in the fully extended piston rod position thus allowing gas which comes out of solution when the shock absorber is unloaded and when the cylinder is in its lowermost position to pass the piston freely into the chamber 34.

I claim:

1. A shock absorbing and energy dissipating device suitable for an aircraft landing gear comprising:
   i. a main container having a single aperture intended to be uppermost in use
   ii. a plunger movable into and out of the aperture in the main container
   iii. a seal at the said aperture to sealingly engage against the relatively movable surface of the plunger
   iv. a volume of liquid within the main container
   v. a second container containing gas at pressure
   vi. a restricted flow passage between the main container and the second container for restricting liquid flow between them
   vii. an unrestricted flow passage for unrestricted gas flow in a generally upward direction from substantially the whole volume of the main container to the second container open when the plunger is in its fully extended position.

2. A shock absorbing and energy dissipating device as claimed in claim 1 wherein the piston rod is hollow and part thereof forms the second container.

3. A shock-absoring and energy dissipating device as claimed in claim 2 wherein the piston rod has abutment means adapted to determine the outermost position of the piston rod at which the piston is spaced from the said seal, the piston rod between the piston and the seal having axially-spaced holes each connecting the hollow piston rod to the cylinder at least the hole nearer to the seal forming part of said unrestricted flow passage.

4. A shock absorbing and energy dissipating device as claimed in claim 1 including valve means responsive to movement of the plunger to close the said unrestricted passage.

5. A shock absorbing and energy dissipating device as cliamed in claim 4 wherein the unrestricted flow passage includes at least one hole through the piston, and the valve means comprises a valve member adapted to seat over the end of the hole when the piston rod moves at more than a predetermined speed into the cylinder.

6. A shock absorbing and energy dissipating device as claimed in claim 5 wherein the valve member has at least one flow-restricting orifice co-operable with the hole through the piston when seated over the hole.

7. A shock absorbing and energy dissipating device as claimed in claim 5 wherein the hole through the piston is co-operable with a second valve member adapted to seat over the other end of said hole when the piston rod moves at more than a predetermined speed into the cylinder.

8. A shock absorbing and energy dissipating device as claimed in claim 7 wherein the second valve member has at least one flow-restricting orifice co-operable with the hole through the piston when seated thereover.

9. A shock absorbing and energy dissipating device as claimed in claim 1 wherein the main container is a cylinder and the plunger is a piston rod, a piston being formed at the inner end of the piston rod to slidably engage within the cylinder, the second container being in unrestricted connection with the zone defined between the piston, the piston rod, the cylinder and the seal, said zone forming part of the unrestricted flow passage.

10. A shock absorbing and energy dissipating device as claimed in claim 1 wherein the second container is formed internally within the plunger.

11. A shock absorbing and energy dissipating device as claimed in clain 1, the dimensions of the plunger being such taht the total reduction in fluid volume within the device when the plunger fully enters the main container is greater than the volume of gas in the second container in the fully extended position of the plunger.

12. A shock absorbing and energy dissipating device as claimed in claim 1 wherein the total fluid volume in the fully-extended position of the device does not exceed five times the reduction of total fluid volume caused by entry of the piston rod into the cylinder during movement of the rod from the fully-extended position to the fully-contracted position.

* * * * *

UNITED STATES PATENT OFFICE
CERTIFICATE OF CORRECTION

Patent No. 3,747,913　　　　　　　　　Dated July 24, 1973

Inventor(s)　Ralph Savery

It is certified that error appears in the above-identified patent and that said Letters Patent are hereby corrected as shown below:

Claim 2, line 2, change "claim 1" to --claim 9--.

Claim 12, line 2, change "claim 1" to --claim 9--.

Signed and sealed this 8th day of January 1974.

(SEAL)
Attest:

EDWARD M. FLETCHER, JR.　　　　　RENE D. TEGTMEYER
Attesting Officer　　　　　　　　　Acting Commissioner of Patents